(12) United States Patent
Sabharwal

(10) Patent No.: US 10,320,578 B2
(45) Date of Patent: Jun. 11, 2019

(54) METHOD OF ACCESSING NETWORK CONNECTIVITY WITH A PORTABLE COMPUTING DEVICE

(71) Applicant: Robert James Sabharwal, Westborough, MA (US)

(72) Inventor: Robert James Sabharwal, Westborough, MA (US)

( * ) Notice: Subject to any disclaimer, the term of this patent is extended or adjusted under 35 U.S.C. 154(b) by 23 days.

(21) Appl. No.: 15/693,213

(22) Filed: Aug. 31, 2017

(65) Prior Publication Data

US 2018/0062865 A1  Mar. 1, 2018

Related U.S. Application Data

(60) Provisional application No. 62/381,750, filed on Aug. 31, 2016.

(51) Int. Cl.
| | |
|---|---|
| *H04L 12/14* | (2006.01) |
| *H04W 4/24* | (2018.01) |
| *H04W 8/00* | (2009.01) |
| *H04W 12/08* | (2009.01) |

(52) U.S. Cl.
CPC ...... *H04L 12/1457* (2013.01); *H04L 12/1432* (2013.01); *H04W 4/24* (2013.01); *H04W 8/005* (2013.01); *H04W 12/08* (2013.01)

(58) Field of Classification Search
CPC . H04L 12/1432; H04L 12/1457; H04L 12/14; H04W 12/08; H04W 8/005; H04W 4/24; H04W 8/00
USPC ........................................................ 370/259
See application file for complete search history.

(56) References Cited

U.S. PATENT DOCUMENTS

| | | | | |
|---|---|---|---|---|
| 9,223,902 B1* | 12/2015 | McHugh | ........... | G06F 17/30967 |
| 9,557,889 B2* | 1/2017 | Raleigh | ................. | G06F 3/0482 |
| 10,009,773 B2* | 6/2018 | Smith | .................... | H04L 63/168 |
| 10,104,599 B2* | 10/2018 | Hou | ........................ | H04L 63/20 |
| 2008/0062940 A1* | 3/2008 | Othmer | .................... | H04W 4/02 370/338 |
| 2012/0320815 A1* | 12/2012 | Massena | ................. | H04W 4/02 370/313 |
| 2014/0053250 A1* | 2/2014 | Wethington | ............ | H04L 63/10 726/5 |
| 2017/0134947 A1* | 5/2017 | Nilsson | ................. | H04W 12/06 |
| 2018/0007030 A1* | 1/2018 | Penov | .................... | H04L 63/083 |
| 2018/0262910 A1* | 9/2018 | Smith | .................... | H04L 63/168 |
| 2018/0309585 A1* | 10/2018 | Jiang | ...................... | H04W 8/12 |

* cited by examiner

*Primary Examiner* — Man U Phan

(57) ABSTRACT

The accessing of network connectivity with a portable computing device begins with the search for at least one proximal network router within a connectivity range of the portable computing device. An unverified identification is routed from the proximal network router through the portable computing device to the remote server. The unverified identification is compared to the router identification for each network router with the remote server in order to identify the router identification of a matching network router from the plurality of network routers. The router password of the matching network router is routed from the remote server through the portable computing device to the proximal network router. Communication access for the proximal network router is granted to the portable computing device. The portable computing device is free to perform computer functions within a secure wireless communication signal.

6 Claims, 9 Drawing Sheets

METHOD OF ACCESSING NETWORK CONNECTIVITY WITH A PORTABLE COMPUTING DEVICE

The current application claims priority to U.S. provisional application Ser. No. 62/381,750 filed on Aug. 31, 2016.

FIELD OF THE INVENTION

The present invention generally relates to network connectivity with a portable computing device. More specifically, the present invention allows a user to identify and access secure wireless networks with a portable computing device.

BACKGROUND OF THE INVENTION

Data usage is an expense that is difficult to avoid when using a smart device, such as a smart phone, a tablet personal computer (PC), or a laptop. In the event, the smart device or laptop is able to use unlimited data, the data speed may slow down or even prevent the smart device or laptop from performing simple computer functions. Wireless connection to a network over local wireless network (e.g. Wi-Fi) serves as a quick solution to these issues. Wireless connection however is limited as networks may be locked from public use or unsecure, risking sensitive information stored on the smart device or laptop.

Therefore, an objective of the present invention is to provide a secure, wireless network for all portable computing devices. The present invention allows a user to identify which networks are secure amongst a variety of networks. The present invention provides security by sending a secure password to the portable computing device upon request, which connects the portable computing device to the wireless network. The present invention preferably accounts for the usage of a portable computing device with each wireless network, thereby allowing the portable computing device and a router to perform a financial transaction.

DETAIL DESCRIPTIONS OF THE INVENTION

All illustrations of the drawings are for the purpose of describing selected versions of the present invention and are not intended to limit the scope of the present invention.

Figure 1:
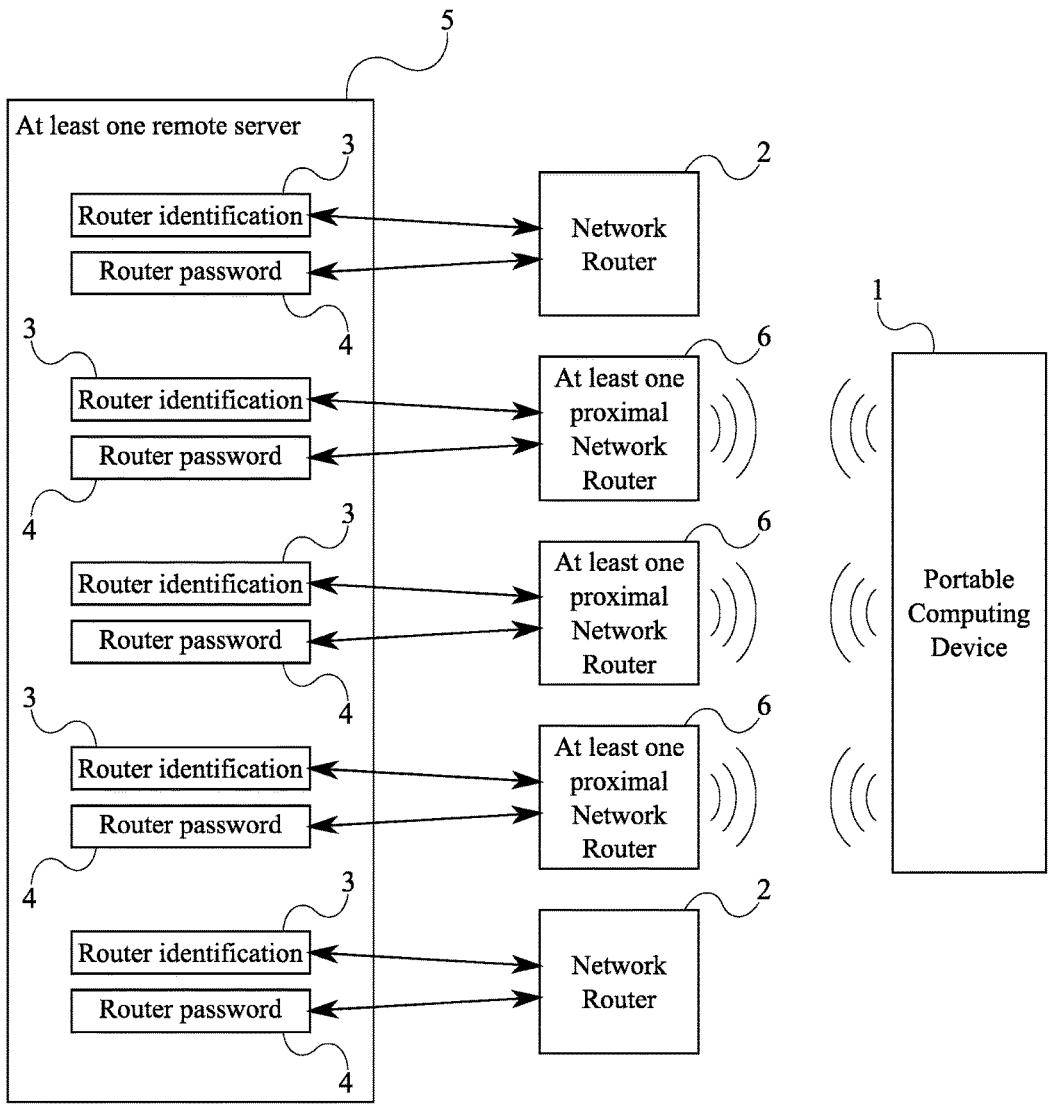
FIG. 1 is a schematic view of the communication between a portable computing device, at least one network router, and at least one remote server.
Figure 2:
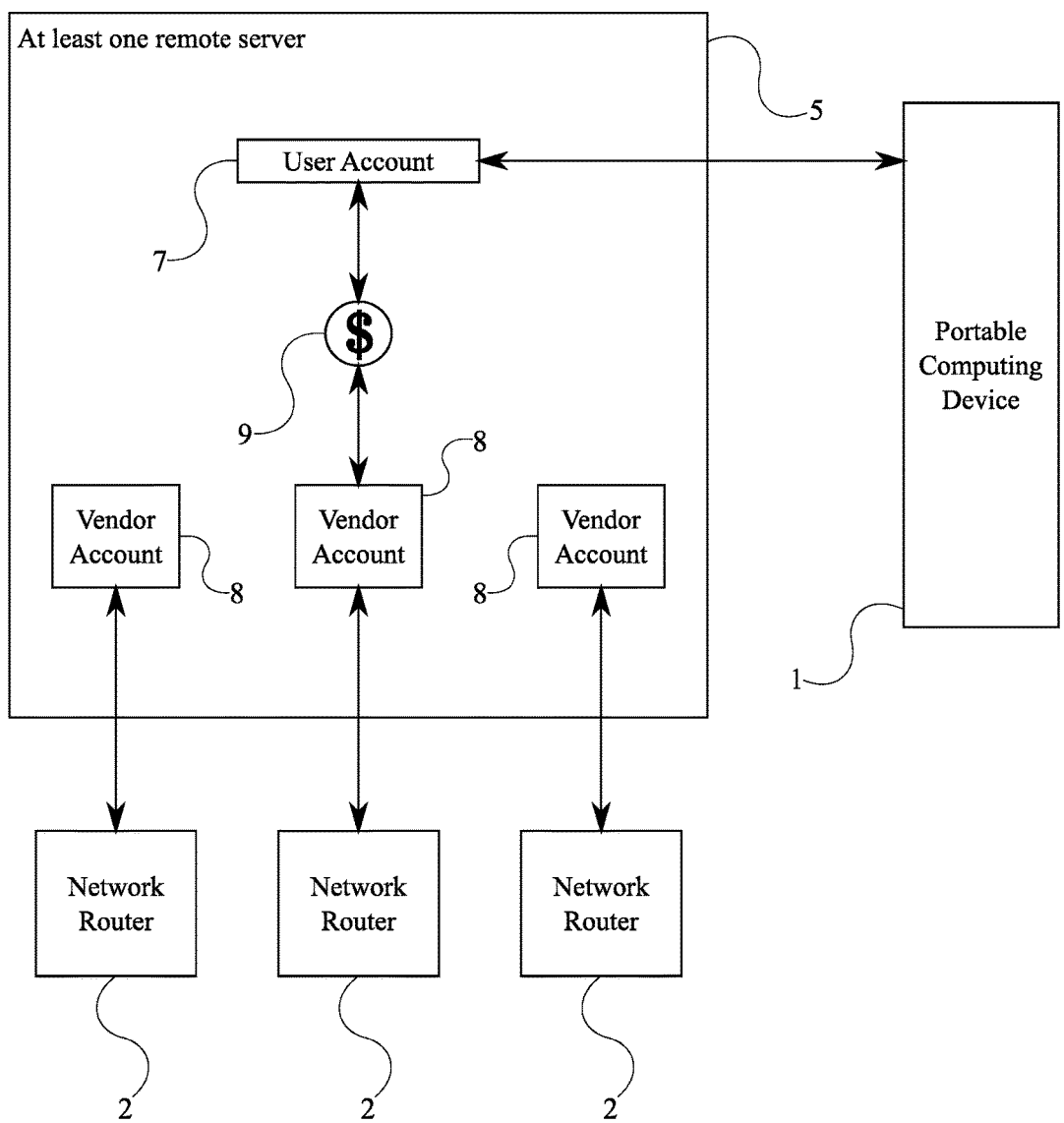
FIG. 2 is a schematic view of the execution of a financial transaction between a user account and a corresponding account of the matching network router.

The present invention is a method of accessing network connectivity with a portable computing device. More specifically, the present invention allows a user to select and wirelessly connect to a plurality of routers within a distance of the portable computing device 1, as seen in FIG. 1. The portable computing device 1 may include, but is not limited to, smart phones, tablet person computers (PC), and laptops. The portable computing device 1 allows a user to perform a variety of computer functions without having to remain stationary. The present invention distinguishes between the plurality of network routers 2 that have been registered with present invention, which are more secure in comparison to the routers that are not registered with the present invention. Thus, the physical system used to implement the method of the present invention, as shown in FIG. 1, includes a plurality of network routers 2, wherein each network router 2 is associated with a router identification 3 and a router password 4 (Step A). Each of the plurality of network routers 2 provide a wireless data feed to the portable computing device 1. The physical system of the present invention further includes, as seen in both FIG. 1 and FIG. 2, at least one remote server 5, wherein the remote server 5 stores the router identification 3 and the router password 4 for each network router 2 (Step B). The router identification 3 distinguishes each network router 2 amongst the plurality of network routers 2, and the router password 4 provides the portable computing device 1 access to the wireless data feed of the network router 2. Furthermore, the router identification 3 allows the at least one remote server 5 to assess the amount of data used by the portable computing device 1.

Figure 3:
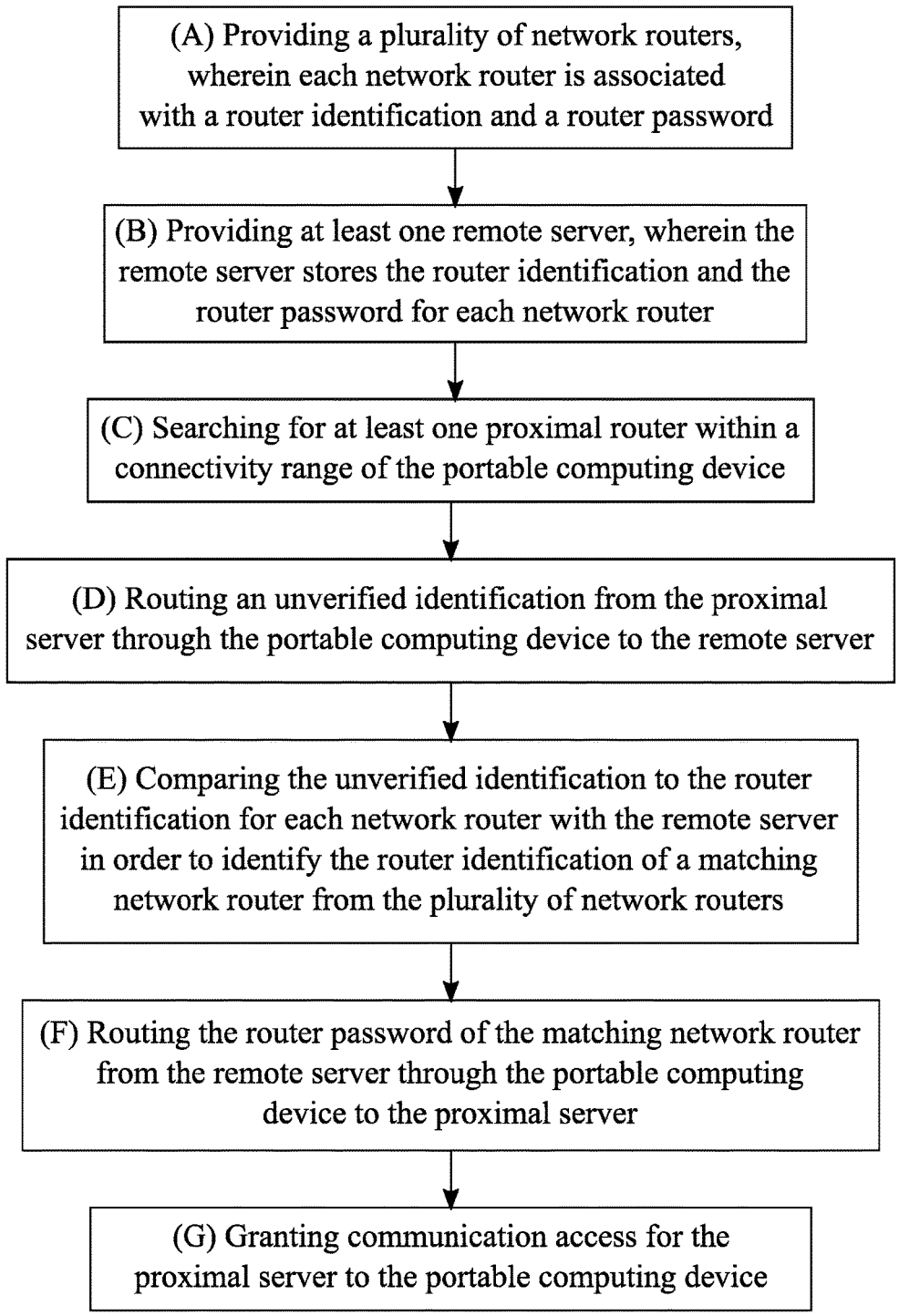
FIG. 3 is a flowchart illustrating the overall process for the present invention.

The overall process for the present invention includes the following steps that are implemented with the portable computing device 1, the plurality of network routers 2, and the at least one remote server 5. As illustrated in FIG. 3, the overall process begins with the search for at least one proximal network router 6 within a connectivity range of the portable computing device 1 (Step C). This maximizes the options for which the portable computing device 1 may connect to a network router 2 that is registered with the at least one remote server 5. An unverified identification is then routed from the proximal network router 6 through the portable computing device 1 to the remote server 5 (Step D) in order to verify if the proximal network router 6 is registered with the remote server 5. The verification of the at least one remote server 5 is established through the comparison of the unverified identification to the router identification 3 for each network router 2 with the remote server 5 so that the remote server 5 is able to identify a matching network router from the plurality of network routers 2 (Step E). In order for the portable computing device 1 to wirelessly connect to the proximal network router 6 the router password 4 of the matching network router 2 is routed from the remote server 5 through the portable computing device 1 to the proximal network router 6 (Step F). Similar to that of secure wireless communication networks, a request for the router password 4 is displayed and the input is required. Once the router password 4 is correctly inputted into the portable computing device 1, communication access is granted for the proximal network router 6 to the portable computing device 1 (Step G).

Figure 4:
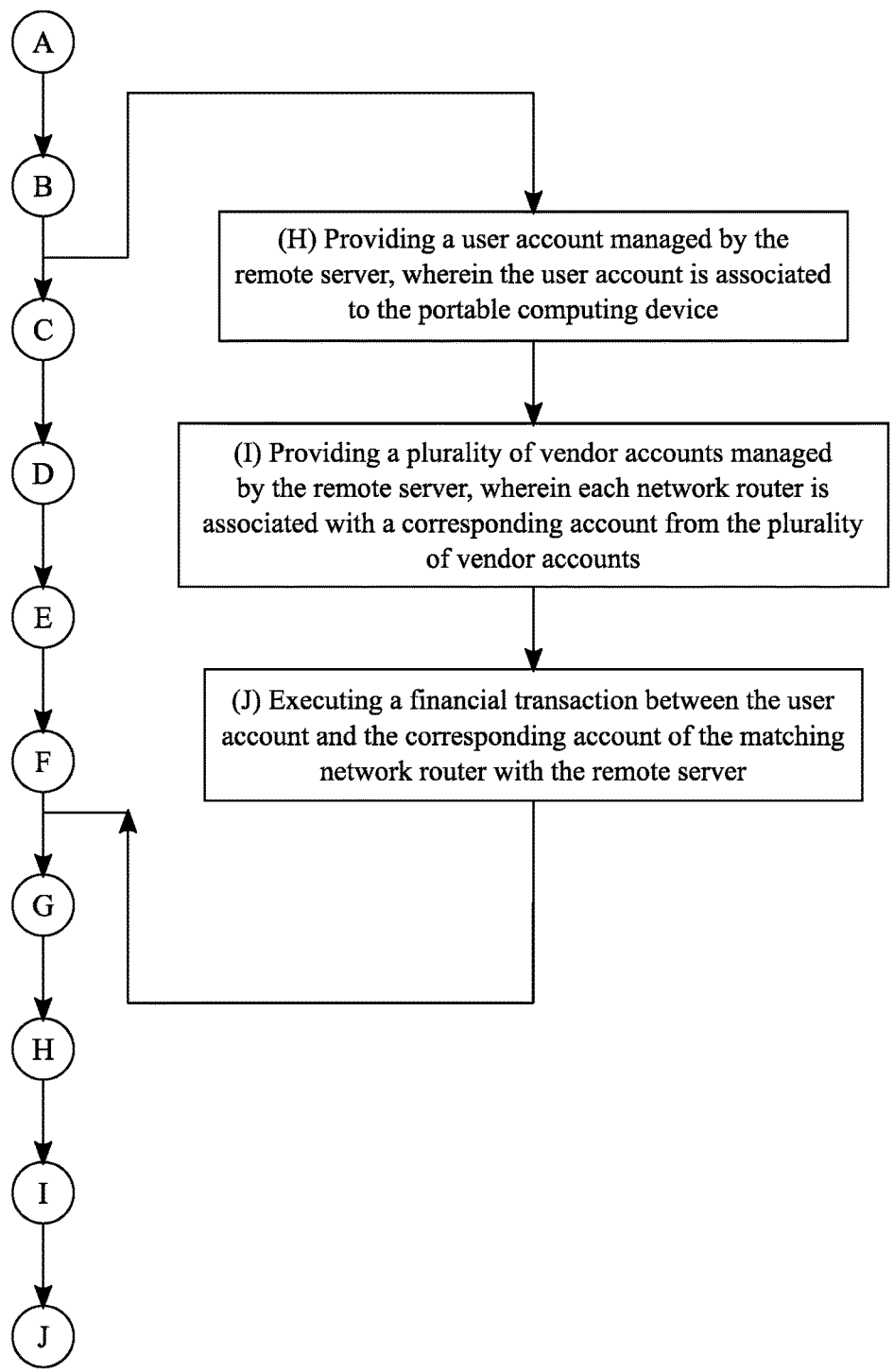
FIG. 4 is a flowchart illustrating the sub-process for executing a financial transaction.

The present invention allows the at least one remote server 5 to determine the value of the data used by the portable computing device 1 based on the amount of data used and the amount of time the data consumption took, as shown in FIG. 4. In order to calculate the value of data used by the portable computing device 1, the present invention further includes a user account 7 managed by the remote server 5, wherein the user account 7 is associated to the portable computing device 1. The user account 7 provides a unique identification for each portable computing device 1 and records the communication between the portable computing device 1 and a matching network router 2. The present invention further includes a plurality of vendor accounts 8 managed by the remote server 5, wherein each network router 2 is associated with a corresponding account from the plurality of vendor accounts 8. Each of the plurality of vendor accounts 8 collects payment from each portable computing device 1 that wirelessly connects to the matching network router 2. More specifically, a financial transaction is executed between the user account 7 and the corresponding account of the matching network router 2 with the remote server 5. The financial transaction prevents portable computing devices 1 from freely connecting to matching network routers 2.

Figure 5:
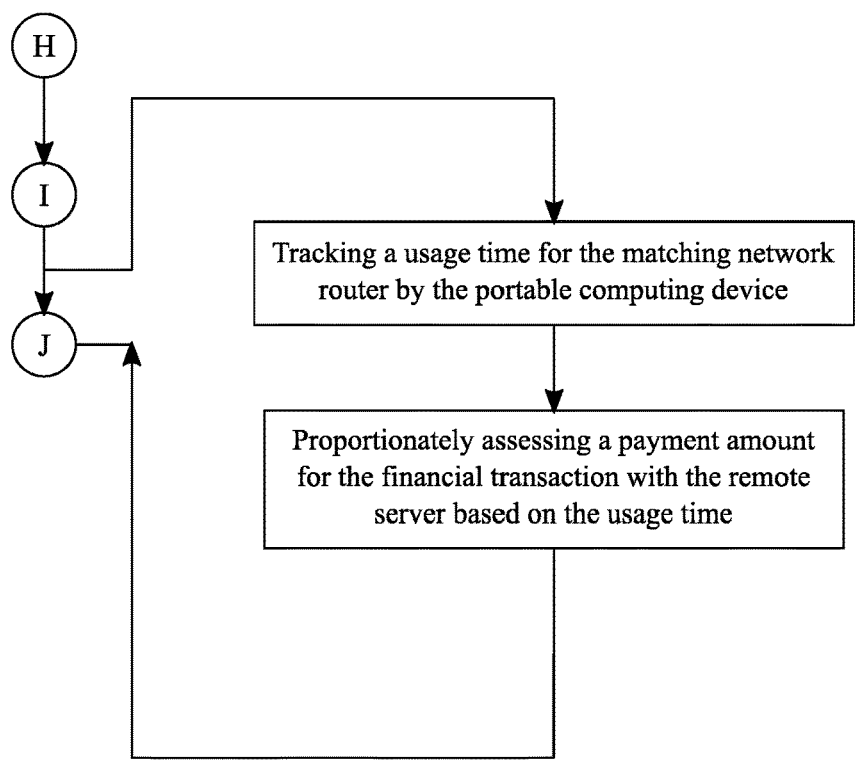
FIG. 5 is a flowchart illustrating the sub-process for executing a financial transaction by proportionally assessing a payment amount with the remote server based on the usage time.
Figure 6:
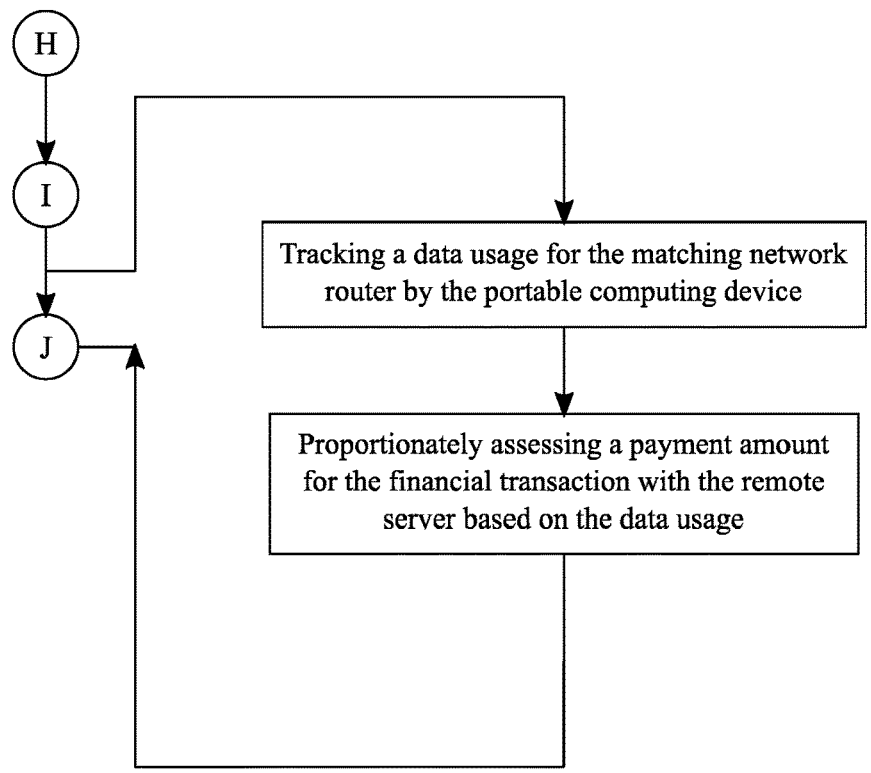
FIG. 6 is a flowchart illustrating the sub-process for executing a financial transaction by proportionally assessing a payment amount with the remote server based on the data usage.

The financial transaction is preferably dependent on the amount of time the portable computing device 1 is wireless connected to the matching network router 2 and the amount of data used by the portable computing device 1 while wirelessly connected to the matching network router 2. As shown in FIG. 5, a usage time is tracked for the matching network router 2 by the portable computing device 1. A payment amount for the financial transaction is proportionally assessed with the remote server 5 based on the usage time. As shown in FIG. 6, a data usage is tracked for the matching network router 2 by the portable computing device 1. The payment amount for the financial transaction is proportionally assessed with the remote server 5 based on the data usage. Alternatively, the present invention could calculate the payment amount for the financial transaction by incorporating both the usage time and the data usage into the calculation.

In the preferred embodiment of the present invention, the calculated payment amount is displayed on the portable computing device 1 after the portable computing device 1 has disconnected from the matching network router 2. The financial transaction is manually completed with the input of various forms of digital payment, including credit card information, debit card information, bank account information, and so on. The financial transaction is automatically completed with delivery of digital payment information that is already associated with the user account 7 that is preferably stored on the remote server 5. In an alternate embodiment of the present invention, the value of usage time and data usage is displayed on the portable computing device 1 for each of the verified network routers 2 of the plurality of network routers 2. In another embodiment of the present invention, a set value is displayed on the portable computing device 1 for each of the verified network routers 2 of the plurality of network routers 2 for usage time and data usage.

Figure 7:
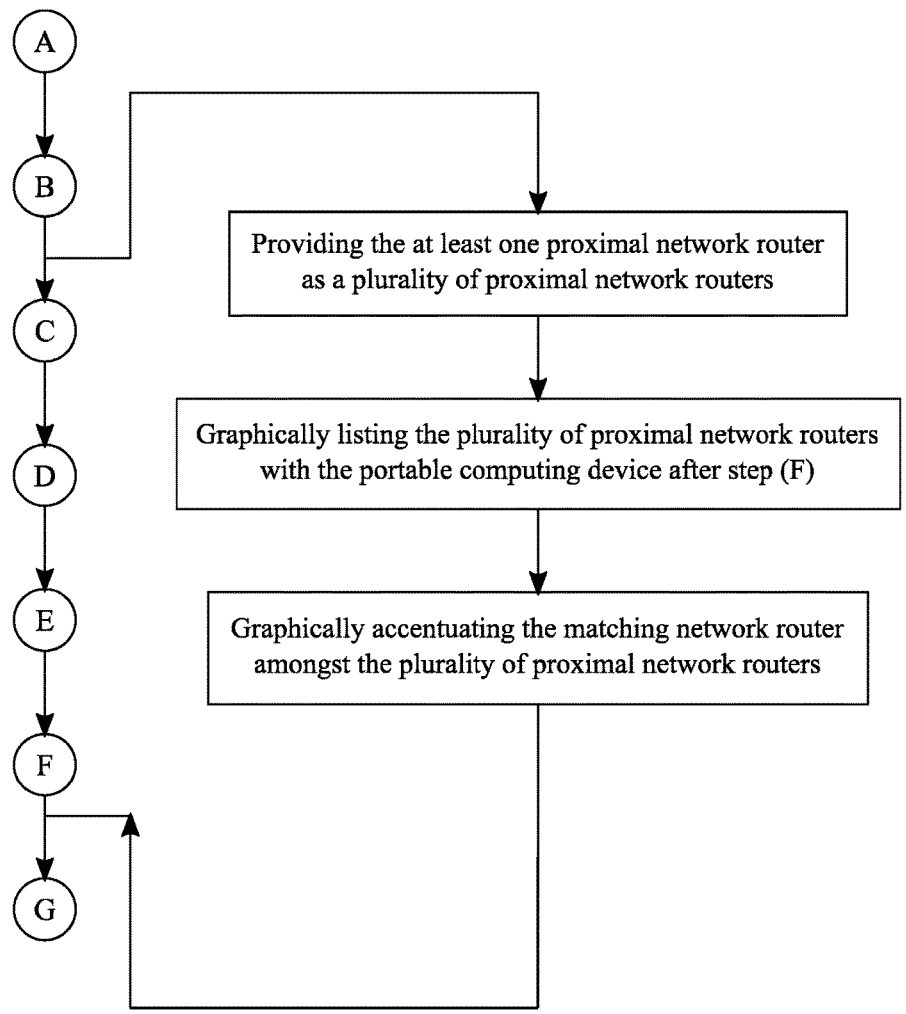
FIG. 7 is a flowchart illustrating the sub-process for graphically listing a plurality of proximal network routers and accentuating the matching network router.

In order to determine which of the plurality of network routers 2 is verified or is a matching network router 2, the present invention further includes at least one proximal network router 6 as a plurality of proximal network routers 6, as seen in FIG. 7. The plurality of proximal network routers 6 is graphically listed with the portable computing device 1 after Step F, as the portable computing device 1 recognizes network routers 2 within a certain connectivity range. The matching network router 2 amongst the plurality of proximal network routers 6 is graphically accentuated in order to identify network routers 2 that are registered with the at least one remote server 5.

Figure 8:
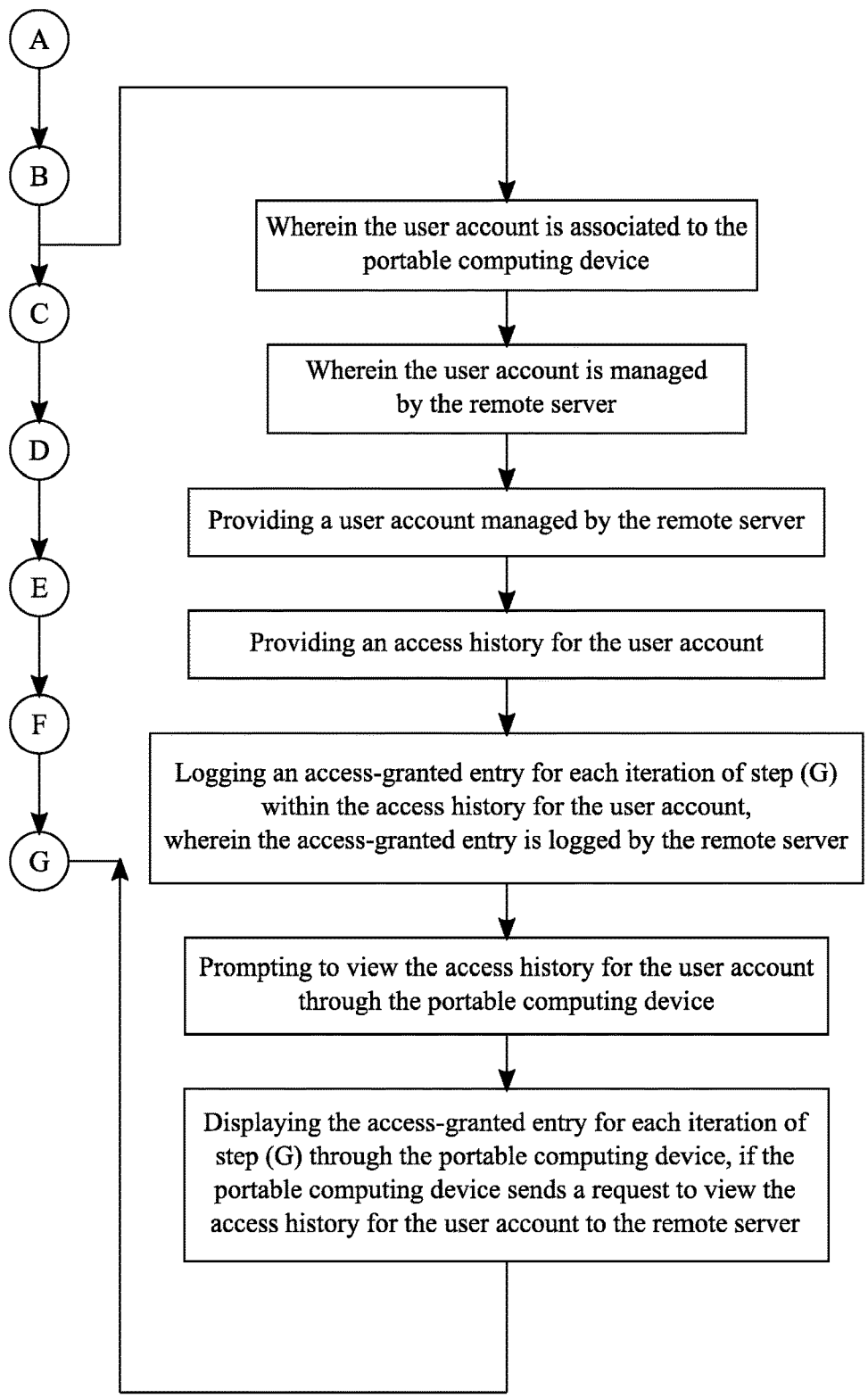
FIG. 8 is a flowchart illustrating the sub-process for viewing usage receipts through the portable computing device.

Furthermore, the preferred embodiment of the present invention records the connections of the portable computing device 1 with that of proximal network routers 6. As seen in FIG. 8, in order to account for the connections of the portable computing device 1, the present invention includes a user account 7 and an access history for the user account 7. The user account 7 is managed by the remote server 5 and the access history is managed by the remote server 5. The access history serves as a documentation of each connection between the portable computing device 1 and each proximal network router 6. In order to keep track of each connection, an access-granted entry is logged for each iteration of Step G within the access history for the user account 7, wherein the access-granted entry is logged by the remote server 5. The access history for the user account 7 is prompted for viewing through the portable computing device 1. The access-granted entry for each iteration for Step G is displayed through the portable computing device 1, if the portable computing device 1 sends a request to view the access history for the user account 7 to the remote server 5.

Figure 9:
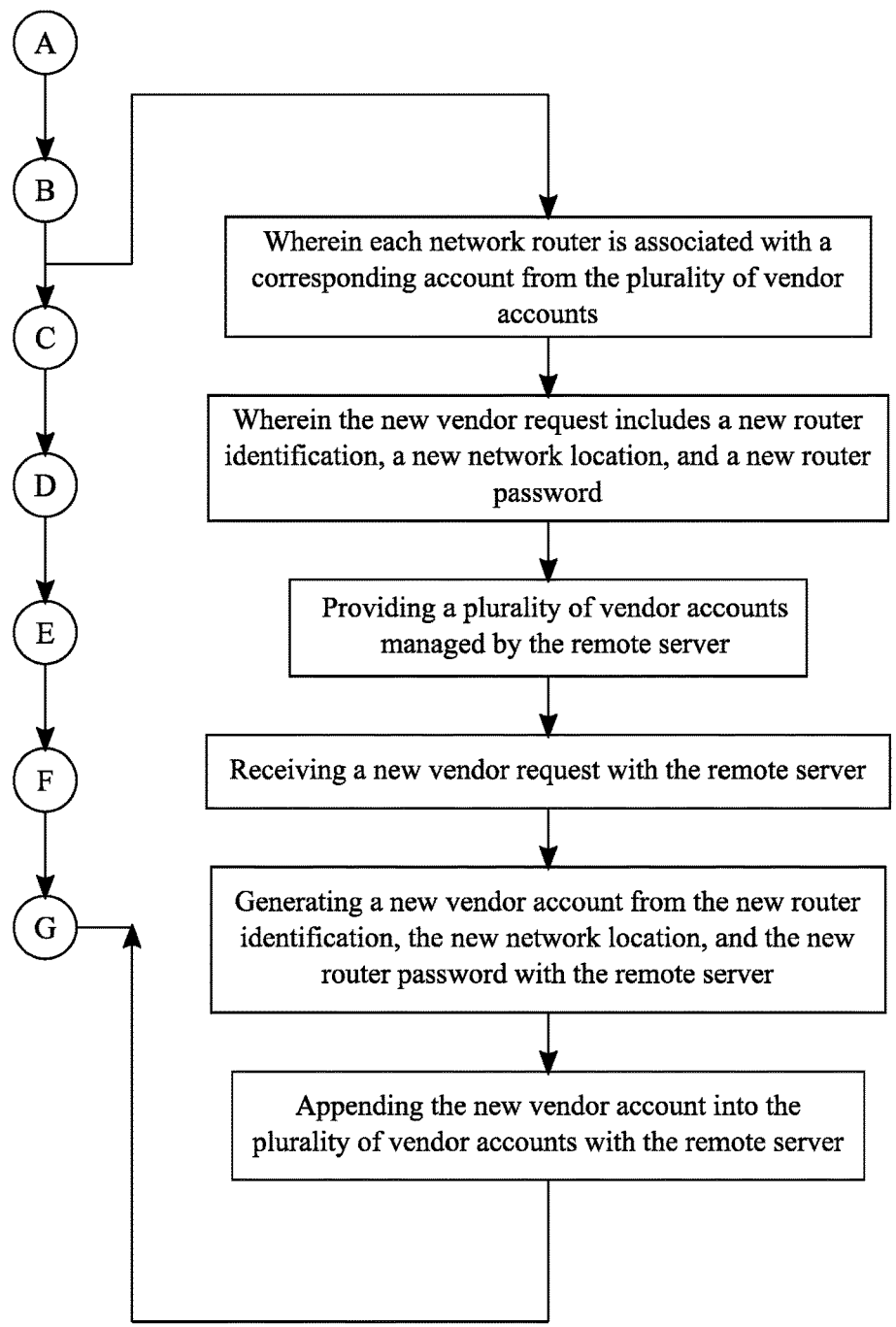
FIG. 9 is a flowchart illustrating the sub-process for appending a new vendor account into the plurality of vendor accounts with the remote server.

In order for each of the plurality of vendor accounts 8 to garnish the respective electronic value exchanges, a new vendor request is received with the remote server 5, wherein the new vendor request includes a new router identification, a new network location, and a new router password, as seen in FIG. 9. A new vendor account 8 is generated from the new router identification, the new network location, and the new router password with the remote server 5, thereby allowing the user account 7 of a portable computing device 1 to connect to the vendor account 8 of a new network router. The new vendor account 8 is appended into the plurality of vendor accounts 8 with the remote server 5 so that the corresponding vendor account 8 may be identified by the portable computing device 1 as a matching network router 2 from the plurality of network routers 2.

Although the invention has been explained in relation to its preferred embodiment, it is to be understood that many other possible modifications and variations can be made without departing from the spirit and scope of the invention as hereinafter claimed.

What is claimed is:

1. A method of accessing network connectivity with a portable computing device, the method comprises the steps:
   (A) providing a plurality of network routers, wherein each network router is associated with a router identification and a router password;
   (B) providing at least one remote server, wherein the remote server stores the router identification and the router password for each network router;
   providing a plurality of vendor accounts managed by the remote server, wherein each network router is associated with a corresponding account from the plurality of vendor accounts;
   receiving a new vendor request with the remote server, wherein the new vendor request includes a new router identification, a new network location, and a new router password;
   generating a new vendor account from the new router identification, the new network location, and the new router password with the remote server;

appending the new vendor account into the plurality of vendor accounts with the remote server;

(C) searching for at least one proximal network router within a connectivity range of the portable computing device;

(D) routing an unverified identification from the proximal network router through the portable computing device to the remote server;

(E) comparing the unverified identification to the router identification for each network router with the remote server in order to identify the router identification of a matching network router from the plurality of network routers;

(F) routing the router password of the matching network router from the remote server through the portable computing device to the proximal network router; and (G) granting communication access for the proximal network router to the portable computing device.

2. The method of accessing network connectivity with a portable computing device, the method as claimed as claim 1 comprises the steps:

providing a user account managed by the remote server, wherein the user account is associated to the portable computing device; and executing a financial transaction between the user account and the corresponding account of the matching network router with the remote server.

3. The method of accessing network connectivity with a portable computing device, the method as claimed as claim 2 comprises the steps:

tracking a usage time for the matching network router by the portable computing device; and proportionately assessing a payment amount for the financial transaction with the remote server based on the usage time.

4. The method of accessing network connectivity with a portable computing device, the method as claimed as claim 2 comprises the steps:

tracking a data usage for the matching network router by the portable computing device; and proportionately assessing a payment amount for the financial transaction with the remote server based on the data usage.

5. The method of accessing network connectivity with a portable computing device, the method as claimed as claim 1 comprises the steps:

providing the at least one proximal network router as a plurality of proximal network routers;

graphically listing the plurality of proximal network routers with the portable computing device after step (F); and graphically accentuating the matching network router amongst the plurality of proximal network routers.

6. The method of accessing network connectivity with a portable computing device, the method as claimed as claim 1 comprises the steps:

providing a user account managed by the remote server, wherein the user account is associated to the portable computing device;

providing an access history for the user account, wherein the access history is managed by the remote server;

logging an access-granted entry for each iteration of step (G) within the access history for the user account, wherein the access-granted entry is logged by the remote server;

prompting to view the access history for the user account through the portable computing device; and displaying the access-granted entry for each iteration of step (G) through the portable computing device, if the portable computing device sends a request to view the access history for the user account to the remote server.

* * * * *